Sept. 25, 1934.  J. S. BELT ET AL  1,974,791
METHOD OF PRODUCING SOLID CARBON DIOXIDE
Filed Jan. 30, 1930  2 Sheets-Sheet 1

Hamilton P. Cady,
Joseph S. Belt,
INVENTORS

BY J. Stanley Burch
ATTORNEY.

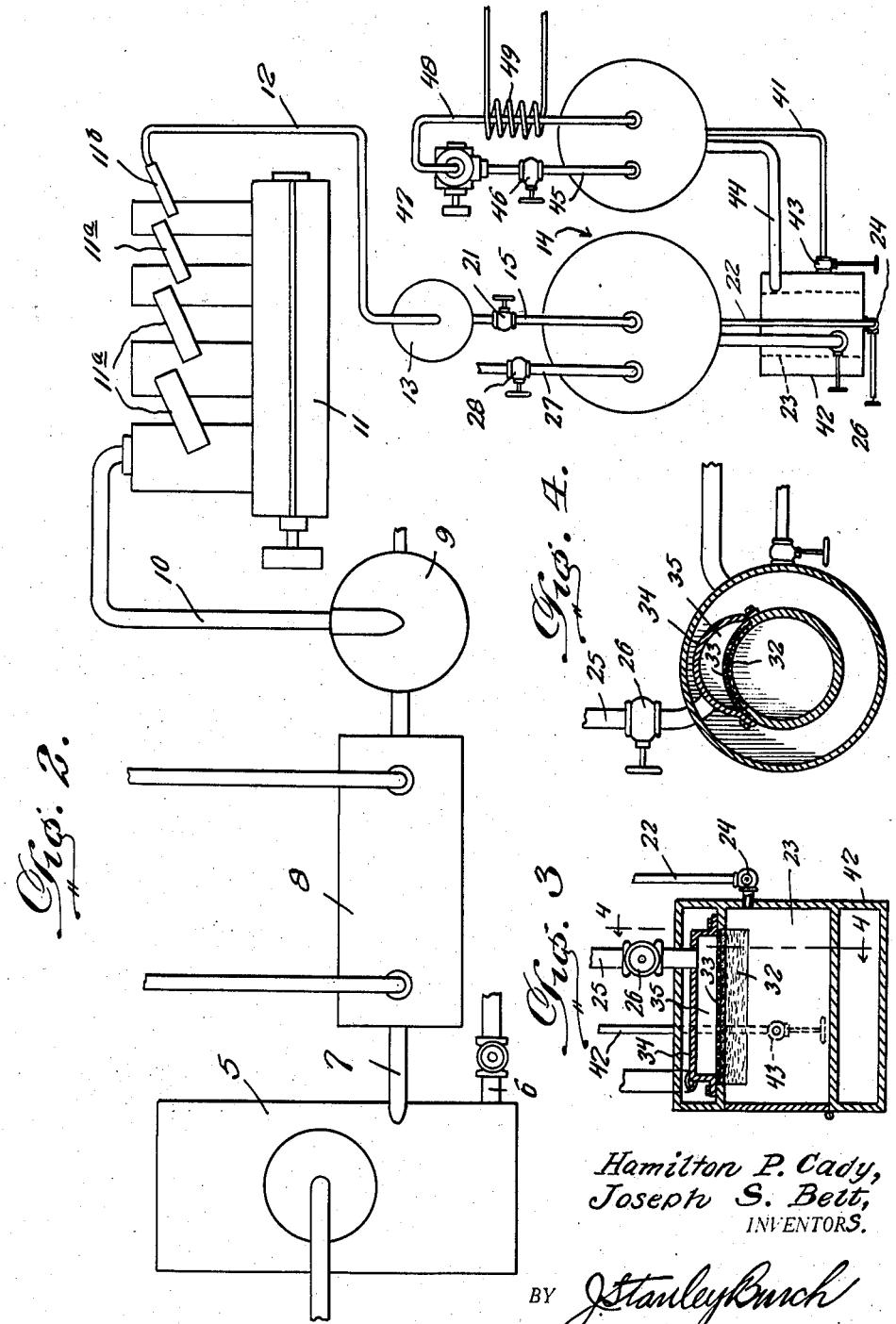

Patented Sept. 25, 1934

1,974,791

UNITED STATES PATENT OFFICE

1,974,791
METHOD OF PRODUCING SOLID CARBON DIOXIDE

Joseph S. Belt, Amarillo, Tex., and Hamilton P. Cady, Lawrence, Kans., assignors, by direct and mesne assignments, to J. S. Belt Natural Resource Corporation, Phoenix, Ariz.

Application January 30, 1930, Serial No. 424,655

2 Claims. (Cl. 62—121)

The present invention relates to quantity production of solidified carbon dioxide or compressed carbon dioxide snow, such as is now commercially used to some extent for refrigeration purposes.

Carbon dioxide snow is now generally produced from carbon dioxide which is maintained in liquid form by subjecting it to critical temperature and pressure of liquefaction, the liquid being transformed to snow by releasing the pressure to permit sudden gasification of the liquid and expansion of the resultant gas. However, the known processes and apparatus for the production of carbon dioxide snow in this way have not been entirely efficient or satisfactory, and the commercial production and use of carbon dioxide snow for refrigeration purposes has therefore been more or less limited.

As contrasted with the above, the present invention contemplates the burning of natural gas in the presence of air to support combustion, thereby producing flue gases which when dried, are primarily composed of about 10 percent carbon dioxide gas and about 90 per cent nitrogen. These dried flue gases are then compressed to about 3,000 pounds per square inch and cooled to a temperature of about minus 68 degrees centigrade, or slightly about the solidification point of the carbon dioxide gas, whereupon the compressed and cooled gases are discharged into an expansion chamber. The sudden expansion of the gases in the expansion chamber lowers their temperature below the solidification point of the carbon dioxide gas, thus causing a substantial volume of the latter to solidify. The nitrogen, together with any unsolidified carbon dioxide, is allowed to discharge from the expansion chamber, thereby leaving the solidified carbon dioxide in said chamber, for recovery as desired. By reason of my invention the carbon dioxide gas may be readily and cheaply produced in large quantities, and, due to the separation of the carbon dioxide gas from the nitrogen by direct soldification and without any intermediate steps of liquefaction of the carbon dioxide gas, the invention provides for ready and economical production of carbon dioxide snow in large quantities so as to permit its extensive use for refrigeration purposes. Moreover, the process may be readily carried out by the use of a simple and efficient apparatus which is substantially continuous in operation and capable of being properly operated with a minimum amount of skill and attention.

The present invention further contemplates certain novel features whereby the percentage of carbon dioxide gas transformed to snow may be greatly increased, and whereby the cooling of the compressed and expanded gases may be economically effected and readily and properly controlled.

The above and other features of my invention will be more evident from the following description in connection with the accompanying drawings, in which Figure 1 is a diagrammatic elevation, partly broken away and in section, of an apparatus suitable for practice of my invention.

Figure 2 is a diagrammatic plan view thereof.

Figure 3 is a vertical longitudinal sectional view of the expansion chamber; and Figure 4 is a vertical transverse section on line 4—4 of Figure 3.

Figure 1:
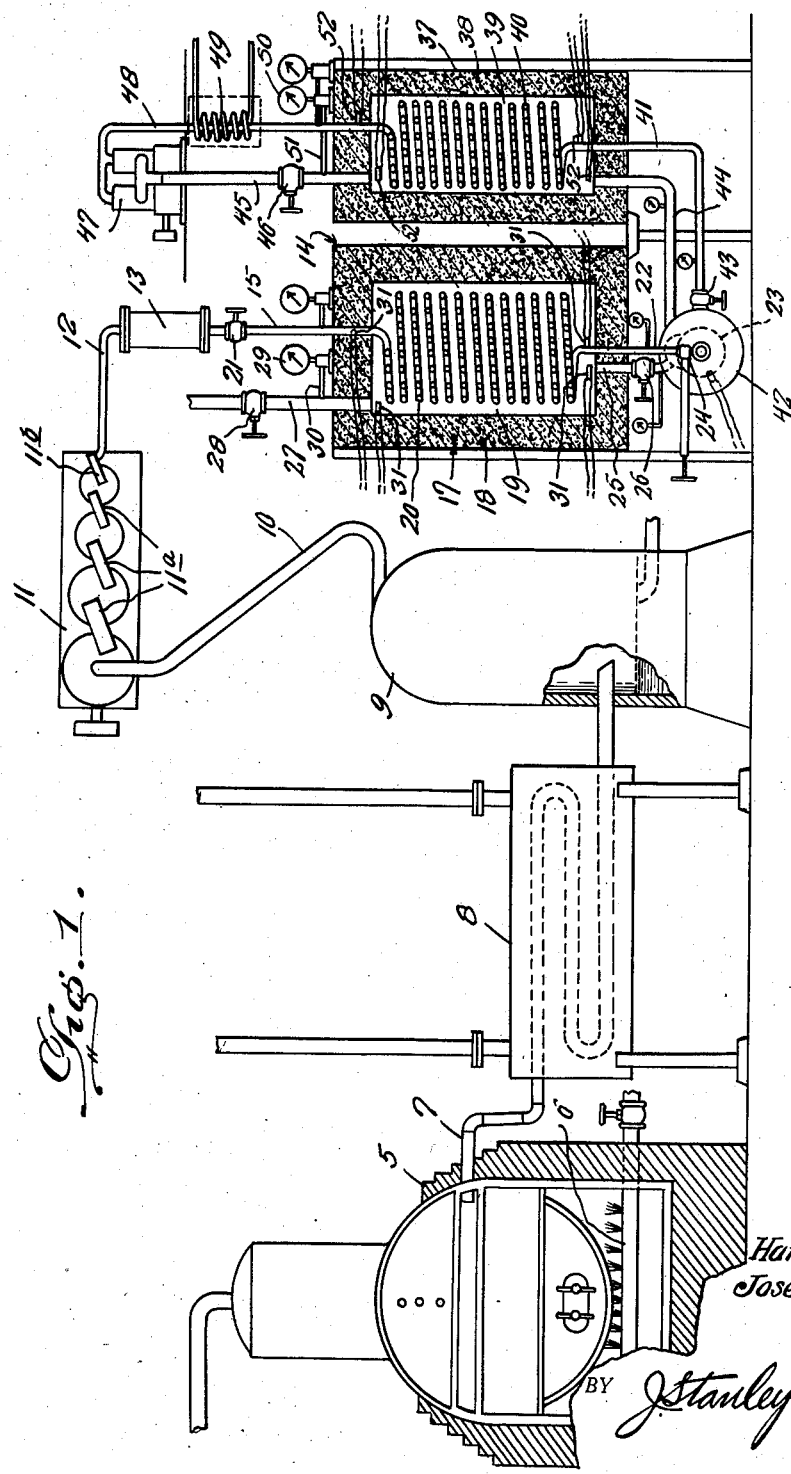

In burning natural gas in the presence of air to support combustion, the flue gases resulting can be said to be primarily composed of about 10 per cent carbon dioxide ($CO_2$) and 90 per cent nitrogen ($N_2$). The flue gases vary, of course, according to the exact nature of the natural gas and the exact amounts of the hydrocarbon and inert gas constituents thereof. However, for the purpose of this specification, we may assume that upon burning natural gas, the flue gases will be constituted of 10 per cent carbon dioxide ($CO_2$) and 90 per cent nitrogen ($N_2$).

For a basis of explanation in arriving at the above mixture, it is pointed out that natural gas is composed largely of the hydrocarbons of methane ($CH_4$) and ethane ($C_2H_6$), the methane predominating in volume, although the volumes of methane and ethane and the ratios of proportions of one to the other will vary. The phenominae of burning natural gases is governed by their hydrocarbon content, but in any case the following equations transpire:

$$CH_4 + 2O_2 = 2H_2O + CO_2$$
$$C_2H_6 + 3\tfrac{1}{2}O_2 = 3H_2O + 2CO_2$$

From the first equation, it is apparent that to burn one volume of methane requires two volumes of oxygen, and as a result of the burning, two volumes of water vapor and one volume of carbon dioxide are produced. As shown by the second equation, three and one-half volumes of oxygen are required to burn one volume of ethane, and as a result of the burning, three volumes of water vapor and two volumes of carbon dioxide are produced.

By the use of air to support the combustion, oxygen is supplied and consumed from it upon reaction with the hydrocarbon in the proportions of one volume of oxygen to each four atoms of hydrogen in a molecule of the hydrogen, forming water; and one volume of oxygen for each atom of carbon in the molecule of the hydrocarbon, forming carbon dioxide. The air or atmosphere is substantially 21 per cent oxygen and 79 per cent nitrogen, by volume, although there are small amounts of helium, argon, etc., which, from a practical standpoint, may be ignored. Therefore, upon consumption of the oxygen of a given volume of air required to burn a given volume of natural gas, the oxygen is consumed in combination, forming water vapor and carbon dioxide, as shown above, and leaving the inert nitrogen in mixture with the water vapor and carbon dioxide. Therefore, upon condensing and removing the water vapor, the flue gases will, upon what may be called an average, consist of about 10 per cent carbon dioxide and 90 per cent, nitrogen, by volume.

As carbon dioxide and nitrogen do not follow the mixture rule, we effect a separation of the carbon dioxide from the nitrogen by direct solidification or without any intermediate steps of liquefaction of the carbon dioxide.

In the drawings, 5 indicates a furnace having a burner 6, supplied with natural gas from a suitable source, and also with sufficient air to furnish the necessary oxygen to effect substantially complete combustion of the hydrocarbon constituents of the natural gas. A pipe 7 is provided to conduct the flue gases from the furnace 5 through a condenser 8, in which the water vapor is condensed. The pipe 7 leads into a settling tank 9 where most of the water may be collected and separated from the gases, the latter passing from the top of the settling tank 8 through a pipe 10 to a conventional multiple-stage compressor 11 having the usual inter-coolers 11a and after-cooler 11b. By means of the compressor 11, the flue gases are placed under a pressure of about 3,000 pounds per square inch, further moisture being expressed from the gases therein and drawn off as necessary. The gases are then conducted by a pipe 12 to an absorbent drier 13, where any remaining trace of moisture may be removed so that it will not freeze in and clog the coils of the cooling apparatus 14 to which the gases are conducted from the drier 13 by a pipe 15. The drier 13 may consist of a cylinder packed with calcium chloride, or the like, through which the gases pass to have the moisture absorbed therefrom.

The cooling apparatus 14 is shown as including a double-walled casing 17, having a packing 18 of heat-insulating material between the walls thereof, and defining an enclosed cooling chamber 19 in which is disposed a cooling coil 20. The pipe 15 has a valve 21 to control the flow of flue gases to the coil 20, whose upper inlet end is connected to said pipe 15. The coil 20 further has a bottom discharge pipe 22 which enters an expansion or snow chamber 23, where it has at its extreme end a restricted outlet opening and a control valve 24. Leading from the chamber 23 is an outlet pipe 25 equipped with a control valve 26 and entering the bottom of the chamber 19. A further pipe 27 forms a top outlet for the chamber 19 and is provided with a control valve 28. A pressure gage 29 is connected with the pipe 27 at the inlet side of valve 28 by means of a branch pipe 30. Thermocouples or resistance thermometers 31 are arranged to indicate the temperatures which maintain at the point where the pipe 25 enters the chamber 19, where the pipe 27 leads from chamber 19, and at the points where flue gases enter and pass from the coil 20.

The expansion or snow chamber 23 is provided along its upper surface with filtering facilities consisting in a filter cloth or screen 32 attached to a perforated metal sheet 33, enclosed within a trap cover 34 which provides a space or gas trap 35. The exhaust pipe 25 connects with the cover 26, providing a means of exhaust for gases from gas trap 35.

Means is provided to super-cool the gases as they are discharged into and expanded in the snow chamber 23, whereby the percentage of carbon dioxide gas transformed to snow will be greatly increased. This super-cooling means per se forms no part of this invention, but preferably consists of a double-walled casing 37 having a packing 38 of heat-insulating material between the walls thereof, and defining an enclosed cooling chamber 39 in which is disposed a cooling coil 40. The bottom of coil 40 has an outlet pipe 41 which enters a cooling jacket 42 that surrounds the body of the snow chamber 23. The pipe 41 has a restricted outlet opening and a control valve 43 at its outlet end. Leading from the jacket 42 is an outlet pipe 44 which enters the bottom of chamber 39. A further pipe 45 forms a top outlet for the chamber 39 and is provided with a control valve 46. The pipe 45 leads to a compressor 47 whose outlet line 48 connects with the top of coil 40. A closed circuit is thus provided through which is circulated a cooling agent, preferably ethylene gas. The ethylene gas is compressed to or below its critical pressure, which, under ordinary circumstances, is about 787 pounds per square inch. After compression, the ethylene gas enters the coil 40 where it is cooled to or below its critical temperature (about minus 9.9 degrees centigrade), whereupon the gas liquefies and discharges through pipe 41 into the jacket 42. As the liquid ethylene discharges into the jacket 42, it expands and returns to gaseous form, thereby producing a very low temperature in jacket 42 and super-cooling the gases discharged into the snow chamber 23. Thus evaporated back to a gas, the ethylene gas passes through pipe 43 into and through the chamber 39 to cool the ethylene gas in the coil 40, and then passes back to the compressor 47 through pipe 45. A coil 49, forming part of a small cooling unit, may be provided to cool the ethylene gas after leaving the compressor 47 and before entering the coil 40. When this small cooling unit is used, a considerably less pressure would have to be exerted upon the ethylene gas for its transition to liquid than its critical pressure. For instance, if the gas is cooled to minus 30 degrees centigrade, a pressure of about 280 pounds per square inch would suffice. As this operates to cool the ethylene below its critical temperature, a given amount of power expended in compressing the ethylene will produce a larger quantity of liquid ethylene to be evaporated in the jacket 42, thus increasing the efficiency of the super-cooler.

A pressure gage 50 is connected with the pipe 45 at the inlet side of valve 46 by means of a branch pipe 51. Thermo-couples or electrical thermometers 52 are arranged to indicate the temperatures which maintain at the point where the pipe 44 enters chamber 39, where the pipe 45 leads from chamber 39, and at the points where the liquid ethylene enters and passes from the coil 40. The valve 46 has the important function, through its operation of providing a back-pressure in chamber 39 and jacket 42, to effectively induce heat transfer from the coil 40 to the cold gas in chamber 39.

In operation, the volume of flue gases entering the coil 20 under the pressure produced by previous compression to approximately 3,000 pounds per square inch, may be controlled, if desired, by the valve 21.

The flue gases flowing down through the coil 20 pass therefrom into pipe 22, through which they are drawn off from said coil. The gases are then permitted to discharge from pipe 22 through a small orifice into the snow chamber 23, the discharge being controlled by means of the valve 24 at the lower extremity of pipe 22.

In their downward passage through the coil 20, the compressed gases are exceedingly cooled and, under the low temperature so obtained and the pressure exerted upon the gases, upon the discharge into the snow chamber, the carbon dioxide solidifies to a substantial degree.

The cold nitrogen which remains uneffected other than being cooled to a low temperature, returns upward under its own pressure from the snow chamber 23 through pipe 25, such return of the nitrogen being regulated as desired by valve 26. The nitrogen then discharges from the pipe 25 into the chamber 19, passing upward therein over the coil 20, and thereby cooling the downwardly moving gases in said coil. The nitrogen then discharges through pipe 27, being regulated in discharge by valve 28. The gauge 29 constantly indicates the pressure in the chamber 19 and in the snow chamber 23.

It is important that the valve 24 be at the lower extremity of pipe 22, for, by being so arranged, no solid carbon dioxide will result in pipe 22.

Care should be exercised to maintain the temperature of the gases in the coil 20 slightly above minus 70° C.—which, under the circumstances, is the approximate point of solidification of carbon dioxide, as any solidification occurring within the coil would tend to clog it and impede or hinder the movement of gases therein. Carbon dioxide and nitrogen when under high pressure do not follow the simple rules of mixture, but each has a marked influence on the properties of the other. As a result of this, liquid carbon dioxide does not separate from a highly compressed mixture of nitrogen and carbon dioxide at temperature where it would be expected to appear from the well-known vapor pressure of liquid carbon dioxide and the calculated partial pressure of carbon dioxide in a mixture. In experiments, no liquid carbon dioxide could be seen to separate from a highly compressed mixture of 90% nitrogen and 10% carbon dioxide, but the latter first appeared as a solid. Apparently, the highly compressed nitrogen dissolved the liquid and solid carbon dioxide to a considerable degree, the solution remaining gaseous.

The expansion of the gases passing from the lower extremity of pipe 22 into snow chamber 23 through a small orifice, causes a rapid expansion of the volume upon its discharge into chamber 23, as well as evaporation of a slight amount of liquid carbon dioxide, if any has resulted previously. This materially lowers the temperature of the already cold gases below the freezing point of carbon dioxide within the snow chamber, causing much of it to solidify in the form of a "snow" and reducing the nitrogen of the volume to substantially the same temperature.

By means of valve 28, a back-pressure can be effected in the snow chamber 23 and in chamber 19. An important function of the back pressure in chamber 23 is to increase the efficiency of the process by making the partial pressure of the carbon dioxide, which is fixed at any given temperature by the vapor pressure of the solid carbon dioxide with which it is in equilibrium, a smaller fraction of the total pressure and so decreasing the fraction of the carbon dioxide in the escaping gases.

At each temperature up to the melting point of solid carbon dioxide there is a certain pressure exerted by the vapor of carbon dioxide at which there is equilibrium between the solid and the vapor. This equilibrium pressure is called the vapor pressure of carbon dioxide. At minus 78.3° C. it is one atmosphere. At minus 104° C. it is about one tenth of an atmosphere. If the gaseous carbon dioxide, carbon dioxide vapor as we called it above, is mixed with some other gaseous substance, say nitrogen, each gas will exert its own individual or partial pressure nearly independent of the presence of the other and the total pressure of the mixture, that shown by a pressure gauge, will be equal to the sum of the partial pressures of the individual gases. These partial pressures are equal to the total pressure multiplied by the fraction of that gas by volume in the mixture. For example, if the total pressure on a mixture of 10% carbon dioxide and 90% nitrogen is 150 lbs. the partial pressure of the carbon dioxide is one tenth of 150, or fifteen lbs. and that of the nitrogen nine tenths of 150, or 135 lbs. Solid carbon dioxide will be in equilibrium with a mixture of gaseous nitrogen and gaseous carbon dioxide when the partial pressure of the carbon dioxide is equal to the vapor pressure of the solid carbon dioxide. At minus 104° C. this is, as stated above, one tenth of an atmosphere and if the flue gases were allowed to expand to one atmosphere while being cooled to minus 104° C., no solid carbon dioxide would be deposited because the 10% of carbon dioxide would be just enough to give a partial pressure of one tenth of an atmosphere and all of the carbon dioxide would escape from the snow chamber along with the nitrogen. Therefore the efficiency of the process under these conditions would be zero. However, if at minus 104° C. a back pressure of 150 lbs., or ten atmospheres, is maintained in the snow chamber the partial pressure of the carbon dioxide, if no condensation should take place, would be one tenth of ten or one atmosphere and, therefore, approximately nine tenths of the carbon dioxide would separate as the solid and only about one-tenth escape with the gaseous nitrogen, making the efficiency of the process about 90%. Therefore, the effect of the back pressure is to increase the yield of solid carbon dioxide snow by decreasing its partial pressure in the escaping gases. Another function of this back-pressure is to more effectively utilize the cooling properties of the cold nitrogen to attain a lower temperature in the chamber 19 than would result if the cold nitrogen was permitted to flow under its own pressure therethrough.

By means of the gage 29, constantly indicating the back-pressure, the proper operation of the valve 28 is made a matter of simplicity.

The resistance thermometers 31, constantly indicating the temperature of the gas volume within the coil 20, and the temperature of the nitrogen entering chamber 19, respectively register the ascertainable temperatures and their fluctuations as occasioned by the operation of valve 28 to increase or diminish the back-pressure.

The valve 26, while not deemed as absolutely requisite, is provided as a matter of precaution so that should it be found expedient to have a greater back-pressure in snow chamber 23 than in chamber 19 under possible circumstances, the same can be attained.

If desired, the pipes 25 and 27 and the pipes 43 and 45 may be associated with coils surrounding the coils 20 and 40, instead of providing the insulated chambers 19 and 39. Other minor changes and substitution of equivalents are contemplated within the spirit and scope of the invention as claimed.

What we claim as new is:

1. The method of making carbon dioxide snow from dried flue gases containing about 10% carbon dioxide and 90% nitrogen, which consists in compressing said dried flue gases to about 3000 lbs. per square inch, cooling said dried and compressed flue gases to a temperature slightly above −76° C., and discharging the compressed and cooled gases through a restricted outlet into a chamber to permit expansion and reduction in the pressure of the gases to about 150 lbs. per square inch so as to cool the gases to about −104° C. and thereby cause solidification of approximately nine-tenths of the carbon dioxide.

2. The method of making carbon dioxide snow from dried flue gases containing about 10% carbon dioxide and 90% nitrogen, which consists in compressing said dried flue gases to about 3000 lbs. per square inch, cooling said dried and compressed flue gases to a temperature slightly above −76° C., discharging the compressed and cooled gases through a restricted outlet into a chamber to permit expansion and reduction in the pressure of the gases to about 150 lbs. per square inch to further cool said gases, and super-cooling said chamber as the gases are discharged and expanded therein so as to further cool the gases to and maintain them at about −104° C. after expansion of the same in said chamber to insure solidification of about nine-tenths of the carbon dioxide.

JOSEPH S. BELT.
HAMILTON P. CADY.